(12) United States Patent
Hollingsworth et al.

(10) Patent No.: US 7,147,204 B2
(45) Date of Patent: Dec. 12, 2006

(54) WIRELESS REMOTE CONTROLLED WATER SHUT-OFF AND LEAK TESTING SYSTEM

(76) Inventors: Lyndol Wade Hollingsworth, 923 Timber Trail, Cedar Park, TX (US) 78813; Edward Meltzer, 27706 Daisy Field Dr., Laguna Nigel, CA (US) 92617

(*) Notice: Subject to any disclaimer, the term of this patent is extended or adjusted under 35 U.S.C. 154(b) by 6 days.

(21) Appl. No.: 11/008,312

(22) Filed: Dec. 10, 2004

(65) Prior Publication Data

US 2005/0127315 A1  Jun. 16, 2005

Related U.S. Application Data

(60) Provisional application No. 60/528,743, filed on Dec. 12, 2003.

(51) Int. Cl.
*F16K 31/02* (2006.01)
(52) U.S. Cl. .............................. 251/129.04; 251/315.01
(58) Field of Classification Search ............ 251/129.04
See application file for complete search history.

(56) References Cited

U.S. PATENT DOCUMENTS

| 4,915,133 | A | * | 4/1990 | Harrison | 137/625.47 |
| 6,945,274 | B1 | * | 9/2005 | Davis | 137/624.11 |
| 6,994,309 | B1 | * | 2/2006 | Fernández-Sein | 251/129.04 |
| 2005/0236594 | A1 | * | 10/2005 | Lilly et al. | 251/129.03 |

* cited by examiner

*Primary Examiner*—J. Casimer Jacyna
(74) *Attorney, Agent, or Firm*—Brian L. Wamsley, Esq.; Goodwin Procter LLP

(57) ABSTRACT

A remote controlled system for shutting off a water supply and testing for leaks, having within a sealed housing a motorized ball valve device with an electronic controller, antenna, power supply, battery-charging device and an evacuation/injection port. The controller receives signals through the antenna from a wireless remote control device, when either of two buttons on the remote control device is pressed the controller receives the wireless RF signal and activates the motorized ball valve device which either stops or starts the water flow through the water line. The battery-charging device is connected to a source of alternating current by a power plug. If the system is installed below-ground an external battery charging device that operates by solar means is connected using matching quick connectors and positioned on the outside of the sealed housing.

13 Claims, 4 Drawing Sheets

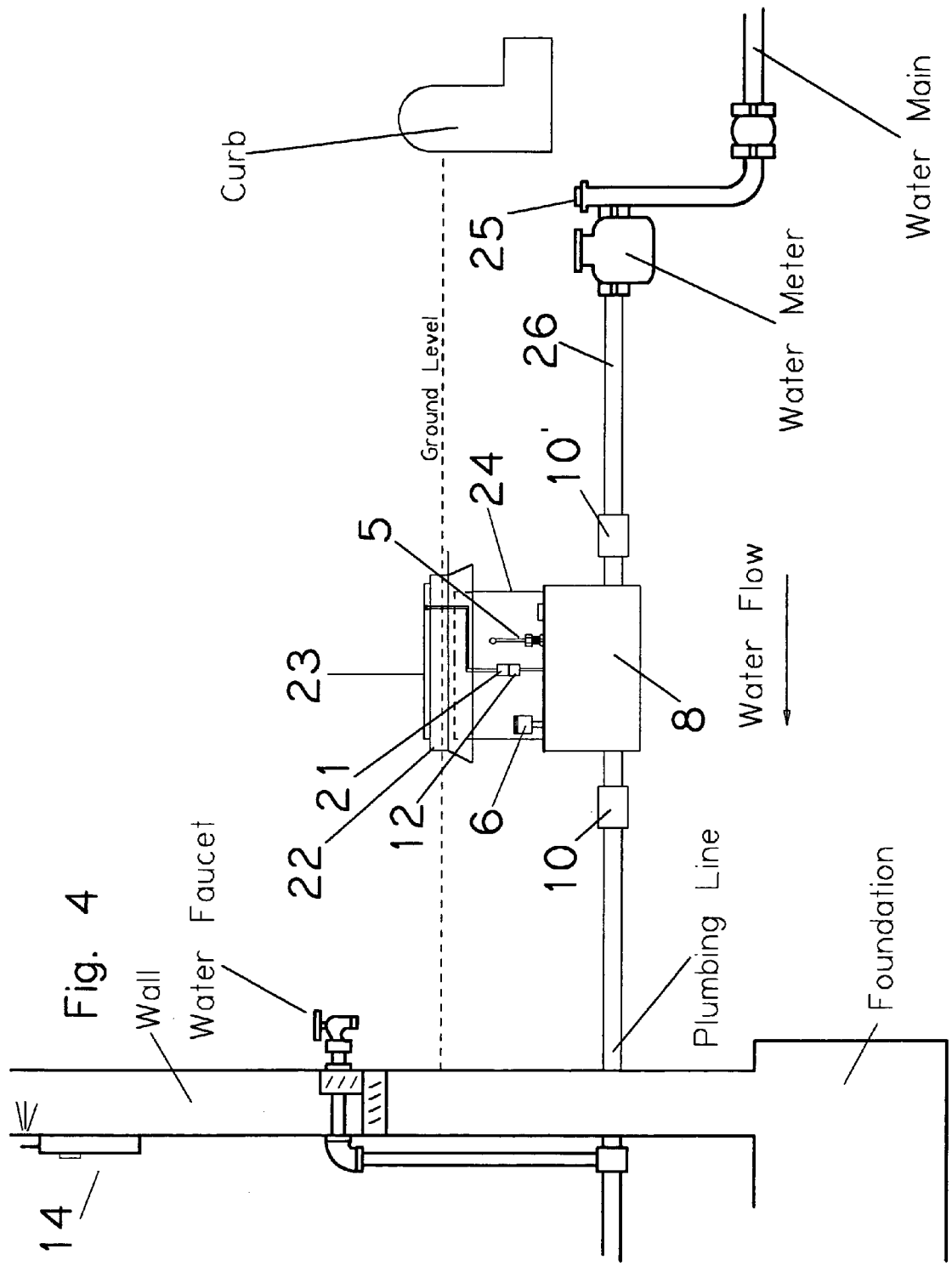

WIRELESS REMOTE CONTROLLED WATER SHUT-OFF AND LEAK TESTING SYSTEM

This application claims priority from U.S. provisional patent application Ser. No. 60/528,743, filed Dec. 12, 2003.

BACKGROUND OF THE INVENTION

This invention relates generally to devices used to shut off and turn on the flow of water to a residence or place of business. The most widely accepted means for shutting off and turning on the flow of water to a residence or place of business is a manually controlled valve positioned in the water line between the water main and the residence or place of business. In the event that a water line ruptures inside the residence or place of business, water will flow through the rupture during the period of time it takes to locate and manually turn the valve to the closed or off position. Having to locate and manually turn off the water in colder climates can be very difficult if snow or ice covers the access to this in-ground valve.

BRIEF SUMMARY OF THE INVENTION

The present invention comprises a controller coupled to a motorized ball valve device. The system includes a substantially sealed housing, an externally mounted antenna capable of receiving radio-frequency (RF) signals, a controller contained within the housing capable of receiving the RF signal sending a further signal to operate a motorized the ball valve, and coupled to a battery power supply. Battery charging can be by way of an internally mounted battery charger that is powered by alternating current or by way of an externally mounted solar battery charger connected by way of a quick connector positioned on the outside of the sealed housing.

Preferably, the remote transmitting device will either be permanently mounted to a wall near the location of the installed system or carried as a portable device such as on a key chain. The remote transmitting device has two buttons; one designated as OFF (RED) for stopping the flow of water and the other ON (GREEN) for starting the flow of water. The command signals transmitted by the pressing of each button will be received through the externally mounted antenna that passes the signal on to the internally mounted controller. Alternatively, the command signal may be transmitted through a wire or cable to the internally mounted controller. The controller will then relay or transfer electrical current from the battery power supply, which may be connected to the controller, on to the motorized ball valve.

Together with a means for evacuating water from the plumbing system, this invention makes it possible to extract water for the purpose of winterizing a residence or place of business. In addition, with the water extracted from the water lines, a tracer gas such as helium can be injected into the plumbing system. With the plumbing system filled with helium under low pressure and the use of a hand-held helium leak detector, it is possible to locate and repair the smallest of water leaks that exist in the plumbing lines. Being able to perform such a test will help eliminate the minute water leaks that waste millions of gallons of water, which often lead to the growth of dangerous airborne mold.

It will be appreciated from the foregoing summary that the present invention represents a significant advance in the field of residential and commercial property protection. In particular, this invention provides a means for controlling the flow of water with the simple pressing of a button. The control device requires no outside electrical connections other than the recharging of the internally mounted battery power supply, which will provide enough current for months without a recharge. Because the controller, power supply, and an internally mounted battery charger are all enclosed in a housing, the invention may be readily installed inside a residence (basement) or a place of business without the need to hard-wire it to a source of alternating current. Other aspects and advantages of the invention will become apparent from the detailed description, taken in conjunction with the accompanying drawings.

BRIEF DESCRIPTION OF THE DRAWINGS

FIG. 4 is a view of the below ground installation of the invention.

DETAILED DESCRIPTION OF THE INVENTION

Figure 1:
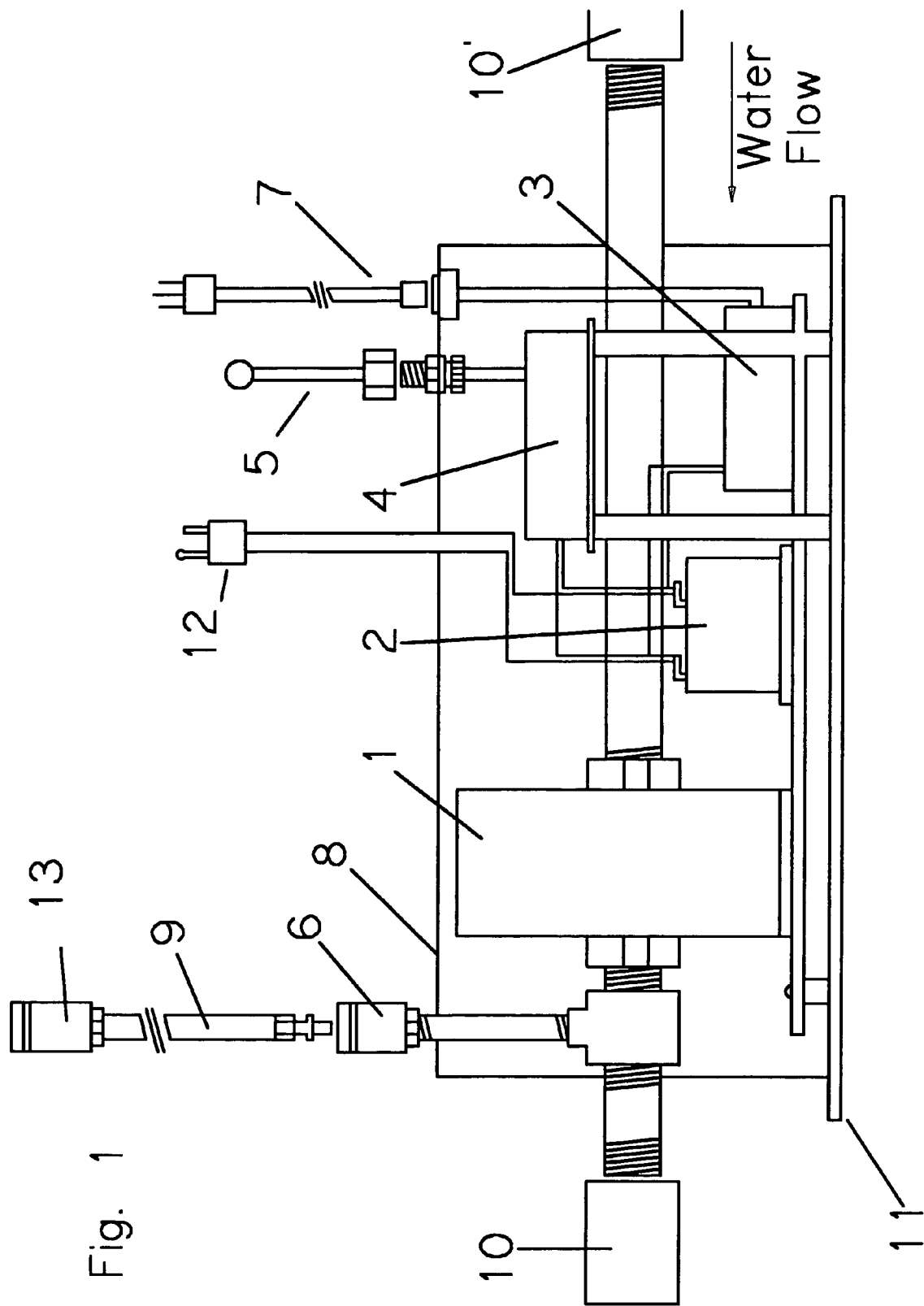
FIG. 1 is a simplified view that shows the components of the invention as they are connected and how they relate to the invention's functionality.

Referring now to the drawings, FIG. 1 is an internal view of housing 8 which is substantially sealed and contains controller 4, motorized ball valve 1, battery power supply 2, battery charger 3, a power cord 7 connected to said battery charger, an externally mounted antenna 5, a quick connector 12 for the connection of an externally mounted battery charging device, evacuation/injection port quick connector 6 positioned in the water line after motorized ball valve 1, an extension hose 9 equipped with a second quick connector 13, two threaded pipe unions 10 and 10', and a mounting plate 11.

Figure 2:
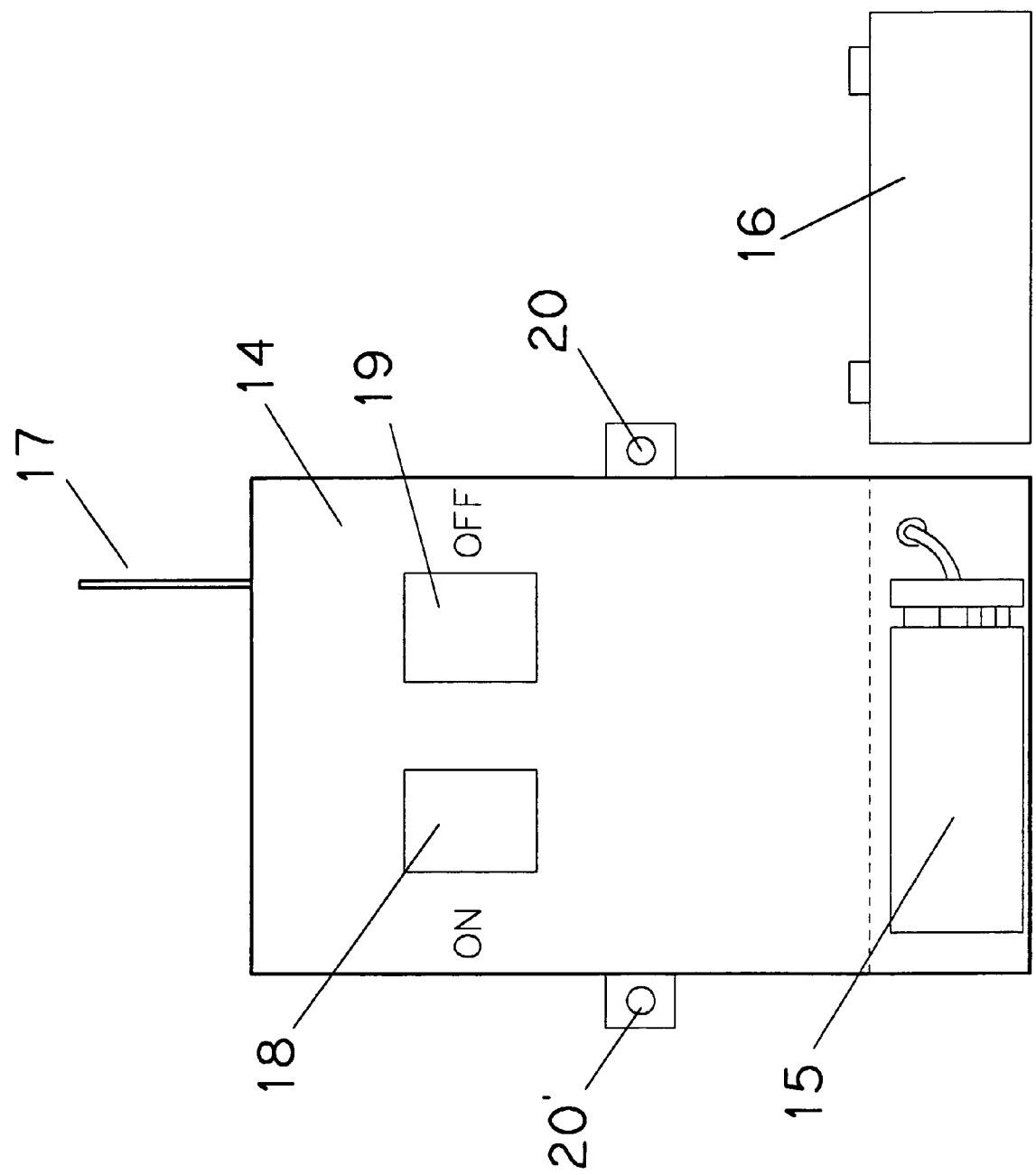
FIG. 2 is a drawing of a wall-mounted, wireless remote control in accordance with the present invention.

FIG. 2 is a view of a wall-mounted remote transmitter 14, featuring two buttons 18 (ON) and 19 (OFF), a removable battery compartment lid 16, a 9-volt battery 15, two wall mounting holes 20 and 20' and an antenna 17.

Figure 3:
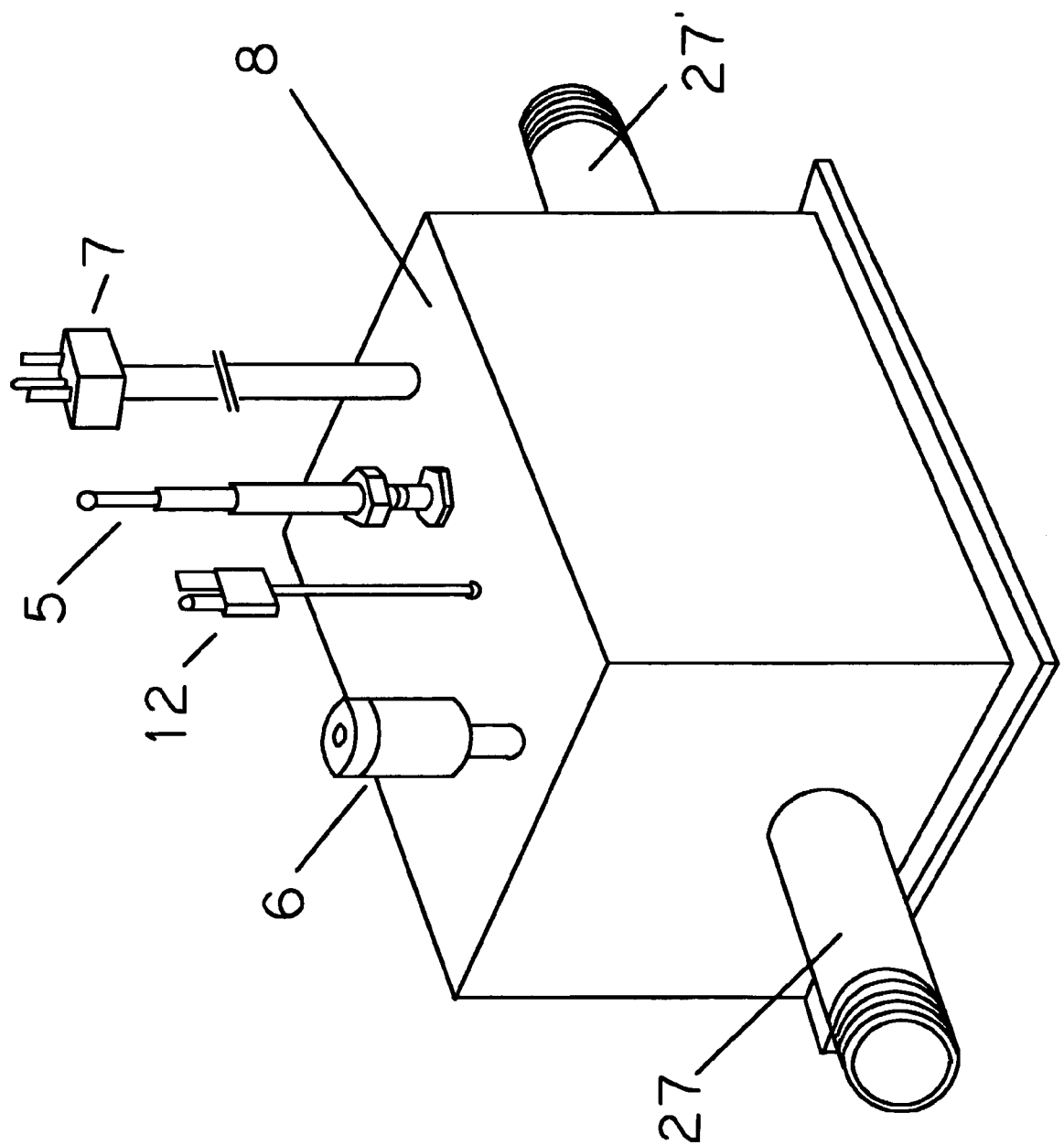
FIG. 3 is an isometric view drawing of the housed portion of the invention.

FIG. 3 is an isometric view of sealed housing 8, with protruding sections of threaded pipe 27 and 27', evacuation/injection port quick connector 6, a quick connector 12 for the connection of an externally mounted battery-charging device, an externally mounted antenna 5 and a power cord connected to the internal battery charging device.

FIG. 4 is a view of an in-ground installation embodiment in which the seal housing 8 is connected in line with the incoming water line 26, by way of two threaded unions 10 and 10', a protective sleeve 24 that is cut to fit, is placed over the evacuation/injection port 6, the externally mounted battery charging device connections 12 and 21, and externally mounted antenna 5. The protective sleeve 24 extends up near ground level and is covered by a flared protective cover 22, a solar battery charging device 23 is mounted on the top of the flared protective cover 22.

With reference to FIGS. 1–4 the invention can be actuated by pressing the OFF button 19 on the wall-mounted transmitting device 14, an RF signal is sent to the externally mounted antenna 5, this signal is received at the controller 4 which transfers a source of direct current from the power source 2 to the motorized ball valve 1, which rotates 90 degrees thereby closing the valve. With the motorized ball valve 1 in the closed position all water flowing to the residence or place of business is stopped.

In one embodiment, the controller 4 consists of a printed circuit board with mounted components, such as a multi-code deciphering RF (radio frequency) receiver, two power relays, and two terminals (which may be coded RED for positive and BLACK for negative), for the input of 12 volt direct current. When a coded "ON" RF signal is transmitted and then received by the controller, one of the two circuit board mounted power relays is activated thereby transferring the applied or wired 12-volt direct current through the relay and on to the motorized ball valve 2 causing it to rotate 90° in a clockwise direction thereby turning ON the flow of water. With the controller designed to receive two separate RF signals, one for ON and one for OFF, the controller 4 must possess the electronic means to distinguish between the two coded signals. Therefor, if the motorized ball valve 2 is already in the ON position, pressing the ON button a second time will not cause the valve to move at all. When a coded OFF RF signal is transmitted and received, the controller will actuate a second power relay that is hard-wired to pass DC current to the ball valve's motor making it turn 90° in the opposite or reverse direction, which in this case would be counter-clockwise. This type of controller circuit ensures that the motor can only turn the precise distance of 90° and then turn back again. One coded signal tells the controller to actuate a power relay that is connected or wired in such a manner to apply forward motor polarity (motor RED to positive current and motor BLACK to negative current). The other power relay would be wired in such a manner to provide reverse motor polarity (motor RED to negative current and motor BLACK to positive current), when actuated.

With the water source stopped, a male quick connector can be inserted into the evacuation/injection port 6, thereby allowing for the evacuation of all the water in the plumbing lines. A suction pump or similar device (not shown) will be utilized for such a procedure. With all the remaining water removed from the plumbing lines, the same evacuation/injection port 6 can be used to inject low-pressure regulated helium into the plumbing lines. With all the water valves in the residence or place of business closed, trapping the helium in the plumbing lines, the helium is used as a tracer gas to locate even the smallest of water leaks. A hand-held sensing device (not shown) is used to detect any leaking helium. After the leak test is completed, the water valves in the residence or place of business will be opened. At such a time, the ON button 18 is pressed and water will flow through the plumbing lines forcing any remaining helium out of the lines. With this completed, the water valves inside the residence or place of business are closed.

The invention is designed in such a way that it can be mounted either above or below ground. In the case of an above ground installation, the internal, onboard battery charger 3 by way of an AC power cord 7 recharges the internal battery power supply 2. In the case of an in-ground installation, the AC power cord 7 is not needed when a solar battery charger 23 is connected to the internal battery power supply 2 by way of quick connectors 12 and 21. The flared protective cover 22 provides protection from the elements and provides a flat surface for the mounting of the solar battery charging device 23. A custom-cut section of PVC sleeve 24 is installed between the ground surface and the topside of the buried in-ground unit 8. This sleeve 24 will provide a secure and clean workspace when the unit is accessed.

What is claimed is:

1. A system for the remote control of water flow through a water-supply line, comprising, a transmitter for sending coded stop and start radio frequency (RDF) signals, and a water shut-off unit, said water shut-off unit comprising:
   a housing that is substantially sealed to prevent the incursion of water or moisture,
   a motorized ball valve located within said housing and connected to said water supply line such that the water flows through said housing and said motorized ball valve,
   a controller located within said housing and capable of receiving the coded RF signals from said transmitter, said controller having means for deciphering said coded RF signals and means for sending an electrical signal corresponding to said decoded signal to said motorized ball valve;
   a power supply source for providing electrical power to said controller and said motorized ball valve,
   wherein, when said motorized ball valve is in an "open" position and said transmitter transmits a coded "stop" signal to said controller, said controller actuates said motorized ball valve to rotate 90° to a "closed" position and thus stop the flow of water and, conversely, when said motorized ball valve is in a "closed" position and said transmitter transmits a coded "on" signal to said controller, said controller actuates said motorized ball valve to rotate 90° to an "open" position and thus start the flow of water.

2. The system according to claim 1 wherein the transmitter sends the coded RF signals through a wire to said controller.

3. The system according to claim 1 wherein said water shut-off unit further comprises a rechargeable power supply and means of recharging said rechargeable power supply.

4. The system according to claim 3 wherein said means of recharging said rechargeable power supply comprises a solar powered battery charger.

5. The system according to claim 3 wherein said means of recharging said rechargeable power supply comprises a direct current receptacle for receiving battery charging current form an external source.

6. The system according to claim 1 wherein said water shut-off unit further comprises means for attaching an external device for evacuation of the water line or injecting a fluid medium into the water line.

7. The system according to claim 6 wherein said means for attaching an external device comprises an evacuation/injection port comprising a coupling device.

8. The system according to claim 1 wherein the transmitter sends the coded RF signals wirelessly to said controller.

9. The system according to claim 1 wherein said water shut-off unit further comprises an antenna connected with said controller for receiving said coded RF signals from said transmitter.

10. The system according to claim 1 wherein said controller further comprises at least one power relay for relaying direct current to said motorized ball valve.

11. The system according to claim 1 wherein said controller comprises a printed circuit board.

12. The system according to claim 11 wherein said controller is configured to operate said motorized ball in only a clockwise or a counterclockwise direction.

13. A wireless system for the remote control of water flow through a water-supply line, comprising,
   at least one wireless transmitter for sending coded stop and start radio frequency (RDF) signals,
   a water shut-off unit, said water shut-off unit comprising:

a housing that is substantially sealed to prevent the incursion of water or moisture, a motorized ball valve located within said housing and connected to said water supply line such that the water flows through said housing and said motorized ball valve, a controller located within said housing and capable of receiving the coded RF signals from said transmitter, said controller having means for deciphering said coded RF signals and means for sending an electrical signal corresponding to said decoded signal to said motorized ball valve;

a power supply source for providing electrical power to said controller and said motorized ball valve, wherein, said at least one wireless transmitter is coded to match said controller by way of an externally mounted antenna capable of receiving said coded RF signals, and wherein when said motorized ball valve is in an "open" position and said transmitter transmits a coded "stop" signal to said controller, said controller actuates said motorized ball valve to rotate 90° to a "closed" position and thus stop the flow of water and, conversely, when said motorized ball valve is in a "closed" position and said transmitter transmits a coded "on" signal to said controller, said controller actuates said motorized ball valve to rotate 90° to an "open" position and thus start the flow of water.

\* \* \* \* \*